(12) United States Patent
Zhang (10) Patent No.: US 12,113,744 B2
(45) Date of Patent: Oct. 8, 2024

(54) INFORMATION INDICATION METHOD AND RELATED DEVICES

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 318 days.

(21) Appl. No.: 17/689,970

(22) Filed: Mar. 8, 2022

(65) Prior Publication Data

US 2022/0200762 A1 Jun. 23, 2022

Related U.S. Application Data (63) Continuation of application No. PCT/CN2019/116858, filed on Nov. 8, 2019.

(51) Int. Cl.
  *H04L 5/00* (2006.01)
  *H04W 72/21* (2023.01)

(52) U.S. Cl.
  CPC ........... *H04L 5/0053* (2013.01); *H04W 72/21* (2023.01)

(58) Field of Classification Search
  CPC .... H04L 5/0053; H04L 5/0096; H04W 72/21; H04W 74/0808; H04W 72/23
  USPC ...................................................... 455/450
  See application file for complete search history.

(56) References Cited

U.S. PATENT DOCUMENTS

| | | | |
|---|---|---|---|
| 2019/0141698 A1 | 5/2019 | Kim et al. | |
| 2019/0306865 A1* | 10/2019 | Medles | H04W 72/0446 |
| 2021/0037605 A1* | 2/2021 | Kundu | H04L 5/0053 |
| 2021/0100004 A1* | 4/2021 | Yang | H04W 72/21 |
| 2022/0232595 A1* | 7/2022 | Lin | H04L 27/2601 |

FOREIGN PATENT DOCUMENTS

| | | |
|---|---|---|
| CN | 106506127 | 3/2017 |
| CN | 107294686 | 10/2017 |
| CN | 108541362 | 9/2018 |
| CN | 109039556 | 12/2018 |
| CN | 109257150 | 1/2019 |
| CN | 110035511 | 7/2019 |

(Continued)

OTHER PUBLICATIONS

Mediatek Inc., "Wideband operation for NR-U," 3GPP TSG RAN WG1 #98bis, R1-1911056, Oct. 2019.

(Continued)

*Primary Examiner* — Don N Vo
(74) *Attorney, Agent, or Firm* — Hodgson Russ LLP (57) ABSTRACT

Provided are an information indication method and related devices. The method includes the following. A network device determines whether a physical uplink control channel (PUCCH) transmission corresponding to a first PUCCH format uses an interlace. If the network device determines that the PUCCH transmission corresponding to the first PUCCH format uses an interlace, the network device transmits indication information to a terminal, where the indication information indicates to the terminal information of the interlace used by the PUCCH transmission corresponding to the first PUCCH format.

19 Claims, 5 Drawing Sheets

---

301 — A NETWORK DEVICE DETERMINES WHETHER A PUCCH TRANSMISSION CORRESPONDING TO PUCCH FORMAT K USES AN INTERLACE

302 — THE NETWORK DEVICE TRANSMITS INDICATION INFORMATION TO A TERMINAL IF THE NETWORK DEVICE DETERMINES THAT THE PUCCH TRANSMISSION CORRESPONDING TO PUCCH FORMAT K USES AN INTERLACE. THE INDICATION INFORMATION INDICATES INFORMATION OF THE INTERLACE USED BY THE PUCCH TRANSMISSION CORRESPONDING TO PUCCH FORMAT K (56) References Cited

FOREIGN PATENT DOCUMENTS

| JP | 2019508930 | 3/2019 |
|---|---|---|
| WO | 2017167003 | 10/2017 |
| WO | 2018031066 | 2/2018 |
| WO | 2018047885 | 3/2018 |
| WO | 2018147692 | 8/2018 |

OTHER PUBLICATIONS

Zte et al., "Considerations on UL reference signals and channels design for NR-U, " 3GPP TSG RAN WG1 Meeting #98bis, R1-1909973, Oct. 2019.

LG Electronics, "Physical layer design of UL signals and channels for NR unlicensed operation," 3GPP TSG RAN WG1 Meeting #94bis, R1-1810268, Oct. 2018.

Nokia et al., "Remaining NR-U enhancements for uplink signals and channels," 3GPP TSG RAN WG1 #98bis, R1-1910594, Oct. 2019.

LG Electronics, "Physical layer design of UL signals and channels for NR-U," 3GPP TSG RAN WG1 #98bis, R1-1911404, Oct. 2019.

EPO, Communication for EP Application No. 19951328.4, May 12, 2023.

ISDEC, Office Action for CA Application No. 3,157,614, Jul. 10, 2023.

VIVO, "Discussion on physical UL channel design in unlicensed spectrum," 3GPP TSG RAN WG1 #98bis, R1-1910203, Oct. 2019.

Ericsson, "On long PUCCH for medium to large payload sizes," TSG-RAN WG1 NR ad-hoc, R1-1701183, Jan. 2017.

CNIPA, First Office Action for CN Application No. 202210581695.1, Jun. 7, 2023.

Zte et al., "Considerations on UL reference signals and channels design for NR-U," 3GPP TSG RAN WG1 Meeting #97, R1-1905950, May 2019.

WIPO, International Search Report and Written Opinion for PCT/CN2019/116858, Jul. 30, 2020.

EPO, Extended European Search Report for EP Application No. 19951328.4, Aug. 26, 2022.

IPI, Office Action for IN Application No. 202227012664, Jul. 27, 2022.

Ericsson, "Feature lead summary 2 for UL Signals and Channels," 3GPP TSG-RAN WG1 Meeting #98b, R1-1911562, 3GPP TSG-RAN WG1 Meeting #98b, R1-1911562, Aug. 2019.

JPO, Office Action for JP Application No. 2022-524704, Sep. 19, 2023.

\* cited by examiner

INFORMATION INDICATION METHOD AND RELATED DEVICES

CROSS REFERENCE TO RELATED APPLICATION(S)

This application is a continuation of International Application No. PCT/CN2019/116858, filed Nov. 8, 2019, the entire disclosure of which is incorporated herein by reference.

TECHNICAL FIELD

This disclosure relates to the field of communication technology, and particularly to an information indication method and related devices.

BACKGROUND

At present, there are some scenarios in which an interlace may be needed for physical uplink control channel (PUCCH) transmission. That is, in uplink data channel transmission in some systems, a basic unit of uplink resource allocation is an interlace structure, to increase channel occupancy rate or the like. Therefore, how to make interlace indication to implement interlaced PUCCH transmission has become a hot issue for research.

SUMMARY

In a first aspect, an information indication method is provided in implementations of the disclosure. The method includes the following. A network device determines whether a PUCCH transmission corresponding to a first physical uplink control channel (PUCCH) format uses an interlace. If the network device determines that the PUCCH transmission corresponding to the first PUCCH format uses an interlace, the network device transmits indication information to a terminal, where the indication information indicates to the terminal information of the interlace used by the PUCCH transmission corresponding to the first PUCCH format.

In a second aspect, an information indication method is provided in implementations of the disclosure. The method includes the following. A terminal receives indication information from a network device, where the indication information indicates information of an interlace used by a PUCCH transmission corresponding to a first PUCCH format. The terminal performs the PUCCH transmission according to the indication information.

In a third aspect, a network device is provided in implementations of the disclosure. The network device includes a transceiver, a processor, and a memory. The memory is configured to store computer programs which, when executed by the processor, are operable with the processor to determine whether a physical uplink control channel (PUCCH) transmission corresponding to a first PUCCH format uses an interlace. When executed by the processor, the computer programs cause the transceiver to transmit indication information to a terminal when the processing unit determines that the PUCCH transmission corresponding to the first PUCCH format uses an interlace, the indication information indicating to the terminal information of the interlace used by the PUCCH transmission corresponding to the first PUCCH format.

In a fourth aspect, a terminal is provided in implementations of the disclosure. The terminal includes a transceiver, a processor, and a memory. The memory is configured to store computer programs which, when executed by the processor, cause the transceiver to receive indication information from a network device, the indication information indicating information of an interlace used by a physical uplink control channel (PUCCH) transmission corresponding to a first PUCCH format. The computer programs, when executed by the processor, are operable with the processor to invoke the communicating unit to perform the PUCCH transmission according to the indication information.

BRIEF DESCRIPTION OF THE DRAWINGS

The following will give a brief introduction to the accompanying drawings used for describing implementations or the related art.

DETAILED DESCRIPTION

The following will describe technical solutions of implementations of the disclosure with reference to the accompanying drawings.

It can be understood that, the technical solutions of the disclosure are applicable to various communication systems, such as a $5^{th}$ generation (5G) system, a new radio unlicensed (NR-U) system, a long term evolution (LTE) such as a licensed-assisted access (LAA)-LTE system, or the like. The technical solutions of the disclosure are also applicable to a future network.

Figure 1:
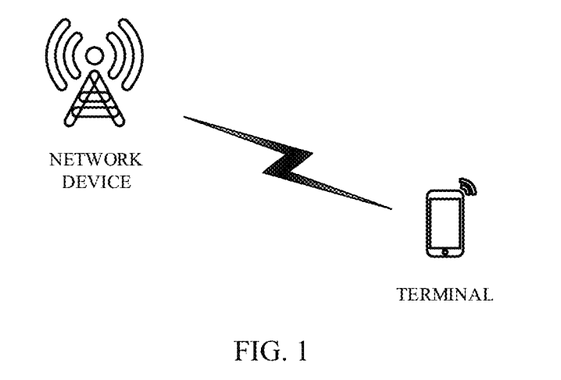
FIG. 1 is an architectural diagram of a communication system provided in implementations of the disclosure.

Refer to FIG. 1, which is an architectural diagram of a communication system provided in implementations of the disclosure. As illustrated in FIG. 1, the communication system may include one or more network devices 101 and one or more terminals 102. FIG. 1 merely illustrates one network device 101 and one terminal 102. Data transmission can be performed between the network device 101 and the terminal 102. For example, data transmission such as physical uplink control channel (PUCCH) transmission can be performed based on an interlace.

"Interlace" may also be called a comb, an interweave, or other names. In implementations of the disclosure, "interlace" is taken as an example for illustration.

In the disclosure, the network device may be an entity for transmitting or receiving information at a network side, which may be, for example, a base station. The base station may be used for communicating with one or more terminals, or may be used for communicating with one or more base stations which have some functions of the terminal (for example, communication between a macro base station and a micro base station such as access point (AP)). The base station may be a base transceiver station (BTS) in a time division synchronous code division multiple access (TD-SCDMA) system, or may be an evolutional NodeB (eNB) in an LTE system, or may be a gNB in a 5G system or an NR system, or the like, which will not be enumerated herein. Alternatively, the network device 101 may also be a transmission point (TP), an AP, a transmission and receiver point (TRP), a relay device, a central unit (CU), or other network devices which have functions of the base station, or the like, and the disclosure is not limited in this regard.

In the disclosure, the terminal is a device that has communication functions and may be, for example, an in-vehicle device, a wearable device, a handheld device (such as smart phone), etc. The terminal may also be called in other names, such as user equipment (UE), subscriber unit, mobile station, mobile unit, terminal device, or the like, and the disclosure is not limited in this regard.

The communication system is operable in an unlicensed spectrum (or referred to as a non-licensed band or the like). For example, the communication system is operable in a carrier aggregation (CA) scenario, a dual connectivity (DC) scenario, a standalone (SA) scenario, an NR single-cell scenario, and the like. The unlicensed spectrum is a spectrum specified by a country or region that can be used for communication between communication devices such as the network device and the terminal described above or the like. Different from a licensed spectrum, the unlicensed spectrum is usually regarded as a shared spectrum, that is, communication devices in different communication systems can use this unlicensed spectrum without applying for exclusive spectrum authority from the government, as long as they meet regulatory requirements on this unlicensed spectrum set by the country or region. If an operating band of NR-U is an unlicensed spectrum, it is necessary to ensure fairness with other systems working in the unlicensed spectrum such as a wireless fidelity (WiFi) system, that is, to ensure that various communication systems, which use an unlicensed spectrum for wireless communication, coexist in harmony in this spectrum. For example, a system can adopt a listen before talk (LBT) mechanism for data transmission. A communication device follows an LBT principle. Before transmitting signals on an unlicensed spectrum channel, the communication device first monitors whether a channel is idle, and the communication device can transmit signals only when the channel is idle. If channel listening indicates that the channel is busy, the communication device cannot transmit signals. During signal transmission, that is, during communication of the communication device in the communication system, there may be a scenario where an interlace is needed for uplink transmission such as PUCCH transmission.

The interlace is discontinuous resources and may be resources with a regular interval, which may be, for example, physical resource block (PRB)-level resources, resource element (RE)-level resources, or the like. As an example, one interlace may include 10 or 11 PRBs.

Figure 2A:
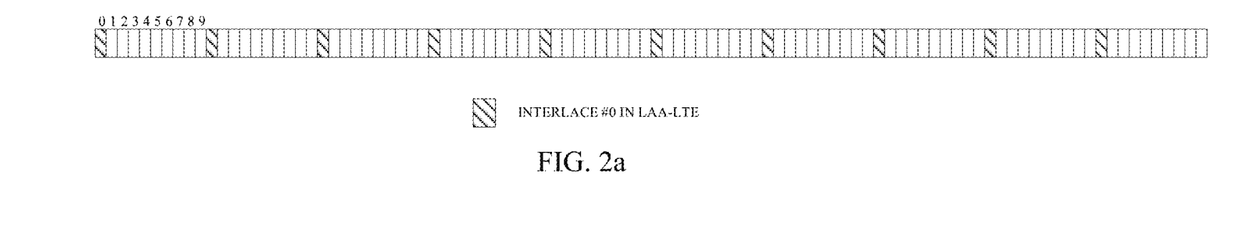
FIG. 2*a* is a schematic diagram of an interlace structure provided in implementations of the disclosure.

For example, signal transmission in an unlicensed spectrum is limited by a maximum power spectral density (that is, a power of a signal transmitted on each megahertz (MHz) bandwidth cannot exceed a certain value). Therefore, in uplink data channel transmission, in order to make uplink data transmission of a terminal device satisfy that a signal at least occupies a specified indicator of a channel bandwidth such as 80% of the channel bandwidth, maximize a transmission power of an uplink signal, etc., a basic unit of uplink resource allocation is an interlace structure. Refer to FIG. 2a, which is a schematic diagram of an interlace structure provided in implementations of the disclosure. As illustrated in FIG. 2a, in a communication system such as an LTE system, when a channel bandwidth is 20 MHz, the system includes 100 resource blocks (RB), and the 100 RBs are divided into 10 interlaces (that is, interlace #0 to interlace #9, or referred to as interlace 0 to interlace 9), where each interlace includes 10 RBs, and any two adjacent RBs of the 10 RBs are equally spaced in frequency domain. For example, RBs included in interlace #0 are RBs 0, 10, 20, 30, 40, 50, 60, 70, 80, 90.

Figure 2B:
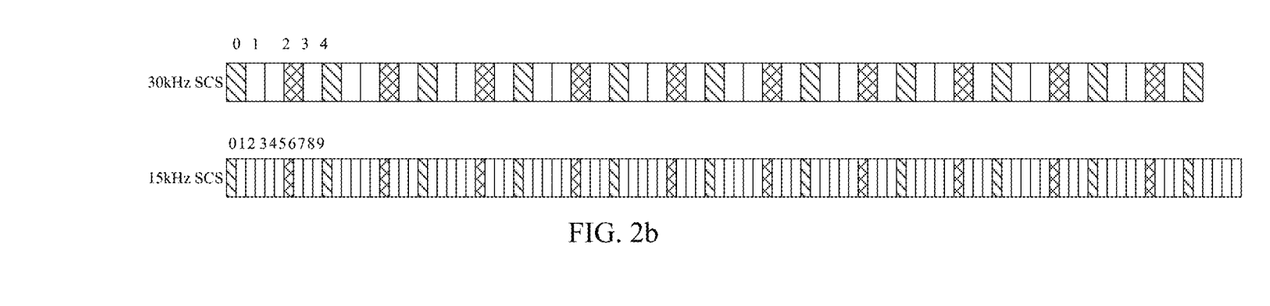
FIG. 2*b* is a schematic diagram of another interlace structure provided in implementations of the disclosure.

For another example, in an NR-U system, suppose that M is the number of interlaces. When a carrier bandwidth is 20 MHz, for a 15 kHz (kilohertz) sub-carrier space (SCS), 10 interlaces are included (that is, M=10), where each interlace includes 10 or 11 PRBs; and for a 30 kHz SCS, 5 interlaces are included (that is, M=5), where each interlace includes 10 or 11 PRBs. As an example, when the SCS is 15 kHz, the number of PRBs included in a 20 MHz bandwidth is 106; and when the SCS is 30 kHz, the number of PRBs included in a 20 MHz bandwidth is 51. Refer to FIG. 2b, which is a schematic diagram of another interlace structure provided in implementations of the disclosure. FIG. 2b illustrates structures of interlaces with number 0 and 6 (i.e. interlace #0 and interlace #6) under a 15 kHz SCS, where interlace 0 includes 11 PRBs and interlace 6 includes 10 PRBs. FIG. 2b also illustrates structures of interlaces with number 0 and 3 (i.e. interlace #0 and interlace #3) under a 30 kHz SCS, where interlace 0 includes 11 PRBs and interlace 3 includes 10 PRBs. It can be understood that, the number of PRBs included in a certain bandwidth in an NR-U system may be consistent or inconsistent with that in an NR system. For example, there may be a new number of PRBs, and the disclosure is not limited in this regard.

For another example, when the carrier bandwidth is greater than 20 MHz, for a 15 kHz SCS, 10 interlaces (i.e. M=10) are included; and for a 30 kHz SCS, 5 interlaces (i.e. M=5) are included, but the number of PRBs included in each interlace can vary with carrier bandwidth, which will not be described in detail herein.

For a first PUCCH format, such as PUCCH format K, the frequency domain resource thereof can be configured with 1 to 16 PRBs in NR release 15 (R15). In some communication systems such as an NR-U system, an interlace may be needed for PUCCH transmission. For example, due to requirements of outgoing calls barred (OCB) within a closed user group (CUG), communication devices such as terminals use an interlace for PUCCH transmission. Therefore, the network device can configure one or more interlaces for the terminal, for example, configure one or more interlaces for PUCCH format K and transmit to the terminal indication information indicating the one or more interlaces, such that the terminal can perform PUCCH transmission based on the interlaces configured by the network device. In the disclosure, multiple interlaces may mean two or more than two interlaces.

K can be any value under a PUCCH format, and the disclosure is not limited in this regard.

It can be understood that, the communication system illustrated in FIG. 1 and the interlace structures illustrated in FIG. 2a and FIG. 2b are merely examples and do not constitute limitation on the disclosure. Those of ordinary skill in the art can appreciate that, with evolution of network architectures and emergence of new service scenarios, for similar technical problems, the technical solutions provided in the disclosure are also applicable.

The disclosure discloses an information indication method and related devices, which can make interlace indication by transmitting indication information to a terminal, thereby achieving interlaced PUCCH transmission. The following will give an elaboration with reference to the accompanying drawings.

Figure 3:
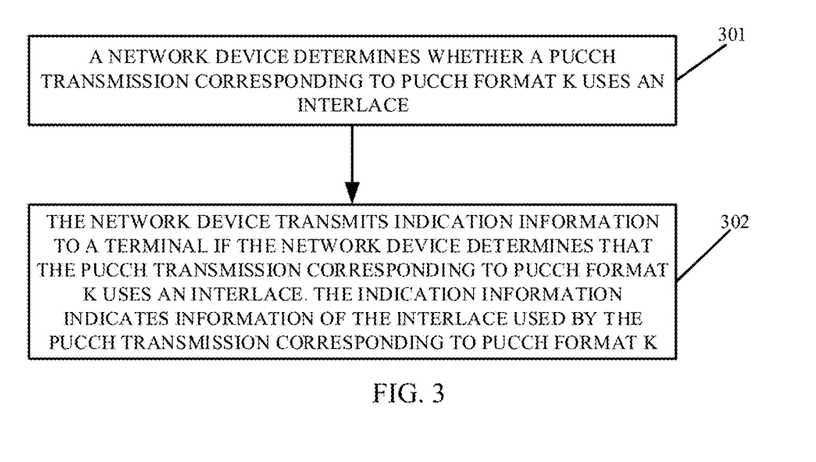
FIG. 3 is a schematic flowchart of an information indication method provided in implementations of the disclosure.

Refer to FIG. 3, which is a schematic flowchart of an information indication method provided in implementations of the disclosure. The method in this implementation is applicable to the communication system described above, and specifically to a network device. In implementations of the disclosure, for example, K=2 and/or K=3. As illustrated in FIG. 3, the method includes the following.

At 301, the network device determines whether a PUCCH transmission corresponding to PUCCH format K uses an interlace.

"Determine whether the PUCCH transmission corresponding to PUCCH format K uses an interlace" may mean determine/configure whether PUCCH format K uses an interlace, or determine whether a frequency-domain resource corresponding to PUCCH format K is an interlace, or determine whether PUCCH format K corresponds to an interlace, or the like.

At 302, if the network device determines that the PUCCH transmission corresponding to PUCCH format K uses an interlace, the network device transmits indication information to a terminal. The indication information indicates information of the interlace used by the PUCCH transmission corresponding to PUCCH format K.

In a possible design, if the network device determines that the PUCCH transmission corresponding to PUCCH format K uses an interlace (hereinafter, "PUCCH format K corresponds to an interlace" for short), the network device can configure one or more interlaces for the terminal. Specifically, the network device may configure the interlace used by the PUCCH transmission corresponding to PUCCH format K (or referred to as an interlace corresponding to PUCCH format K), thereby indicating to the terminal corresponding to the PUCCH transmission the information of the interlace used by the PUCCH transmission corresponding to PUCCH format K ("the interlace corresponding to PUCCH format K" for short). For example, in some cases, such as when a PUCCH load is heavy (for instance, the load is heavier than a load threshold), a frequency-domain resource corresponding to one interlace may be unable to bear a heavy load, and thus the network device can configure multiple interlaces for the terminal for PUCCH transmission.

It can be understood that, "K=2 and K=3" may mean that the network device can determine whether to configure an interlace corresponding to PUCCH format 2 and whether to configure an interlace corresponding to PUCCH format 3 respectively. In other words, the network device determines whether a PUCCH transmission corresponding to PUCCH format 2 uses an interlace. If the network device determines that the PUCCH transmission corresponding to PUCCH format 2 uses an interlace, the network device transmits indication information to the terminal, where the indication information can indicate information of the interlace used by the PUCCH transmission corresponding to PUCCH format 2. The network device determines whether a PUCCH transmission corresponding to PUCCH format 3 uses an interlace. If the network device determines that the PUCCH transmission corresponding to PUCCH format 3 uses an interlace, the network device transmits indication information to the terminal, where the indication information can indicate information of the interlace used by the PUCCH transmission corresponding to PUCCH format 3.

In a possible design, if the network device determines that PUCCH format K corresponds to an interlace, the network device can further determine the number of interlaces used by the PUCCH transmission corresponding to PUCCH format K, that is, determine the number of interlaces corresponding to PUCCH format K. As such, when transmitting the indication information to the terminal, the network device can transmit the indication information to the terminal according to the number of interlaces corresponding to PUCCH format K. Alternatively, in a possible implementation, the number of interlaces corresponding to PUCCH format K can be specified in a standard protocol. Alternatively, the network device can indicate the number of interlaces corresponding to PUCCH format K to the terminal in other manners or signaling. Alternatively, the terminal can determine the number of interlaces corresponding to PUCCH format K in other manners. The disclosure is not limited in this regard.

In a possible design, the indication information may include an identifier of the interlace used by the PUCCH transmission corresponding to PUCCH format K (hereinafter, "an identifier of the interlace corresponding to PUCCH format K" for short). The identifier may refer to a serial number, index, or the like of the interlace. The identifier of the interlace corresponding to PUCCH format K may refer to identifiers of all interlaces (configured interlaces) corresponding to PUCCH format K, or may refer to identifiers of some interlaces, for example, an identifier of a first interlace. In other words, the indication information may include identifiers of all interlaces, or may include identifiers of some interlaces (such as the first interlace) only. The first interlace may be any identifier of all the interlaces, such as an identifier of a $1^{st}$ interlace (such as interlace 0) or an identifier of another interlace, and the disclosure is not limited in this regard.

In a possible design, the number of interlaces corresponding to PUCCH format K may be multiple. The multiple interlaces include a first interlace and one or more second interlaces. The indication information may include the identifier of the first interlace and an offset of each of the one or more second interlaces relative to the identifier of the first interlace (denoted as a first offset). Alternatively, the indication information may include the identifier of the first interlace and one offset (denoted as a second offset, which may also be referred to as an additive offset), where the additive offset can indicate identifiers of multiple second interlaces.

In a possible design, the number of interlaces corresponding to PUCCH format K may be one or multiple. The indication information may include the identifier of the first interlace. The one or more interlaces corresponding to PUCCH format K include one or more second interlaces. The indication information may further include an offset (that is, the first offset) of each of the one or more second interlaces relative to the identifier of the first interlace. Alternatively, the number of interlaces corresponding to PUCCH format K may be multiple. The indication information may include the identifier of the first interlace. The multiple interlaces include multiple second interlaces. The indication information may further include an additive offset, where the additive offset can indicate an identifier(s) of the multiple second interlaces.

In the disclosure, "the multiple interlaces include the first interlace and the one or more second interlaces" may mean that the multiple interlaces consist of the first interlace and the one or more second interlaces, or the multiple interlaces consist of the first interlace, the one or more second interlaces, and interlaces corresponding to PUCCH format K configured for the terminal, etc. Accordingly, "the multiple interlaces include multiple second interlaces may mean that the multiple interlaces consist of the multiple second interlaces, or the multiple interlaces consist of the multiple second interlaces and interlaces corresponding to PUCCH format K configured for the terminal, etc.

In a possible design, the number of interlaces corresponding to PUCCH format K may be one or multiple. The indication information may include one or more offsets (denoted as a third offset, where the third offset may be the same as or different from the first offset described above). The one or more offsets may indicate an identifier(s) of the one or more interlaces. Alternatively, the indication information includes one offset (denoted as a fourth offset, which is also referred to as an additive offset, and the fourth offset may be the same as or different from the second offset described above). The additive offset can indicate an identifier(s) of the one or more interlaces. Optionally, the identifier of the first interlace may be specified in a standard protocol, or may be indicated to the terminal by the network device in other manners. Alternatively, the terminal may determine the identifier of the first interlace in other manners, thereby determining the interlaces corresponding to PUCCH format K (that is, interlaces corresponding to the one or more offsets) according to the identifier of the first interlace and the offset(s) described above.

In a possible design, the indication information may further include the number of interlaces used by the PUCCH transmission corresponding to PUCCH format K, that is, the number of interlaces corresponding to PUCCH format K. Optionally, in a possible design, the number of interlaces may be specified in a standard protocol, or may be indicated to the terminal by the network device in other manners. Alternatively, the terminal can determine the number of interlaces in other manners. The disclosure is not limited in this regard.

In a possible design, the indication information may further indicate information of an LBT subband corresponding to the PUCCH transmission corresponding to PUCCH format K. Optionally, the information of the LBT subband may be carried in a PUCCH resource parameter or carried in a PUCCH format K parameter. Optionally, in a possible design, the information of the LBT subband may be specified in a standard protocol, or may be indicated to the terminal by the network device in other manners. Alternatively, the terminal may determine the information of the LBT subband in other manners. The disclosure is not limited in this regard.

In a possible design, the indication information may be carried in the PUCCH resource parameter or carried in the PUCCH format K parameter. Alternatively, the indication information may include first indication information and second indication information, where the first indication information may be carried in the PUCCH resource parameter and the second indication information may be carried in the PUCCH format K parameter. Optionally, the first indication information is part of the indication information, for example, may indicate the first interlace. For example, the first indication information may include the identifier of the first interlace. The second indication information is also part of the indication information, such as information in the indication information other than the first indication information. The second indication information may indicate an identifier(s) of one or more second interlaces. Multiple interlaces corresponding to PUCCH format K may include the first interlace and the one or more second interlaces. In addition, optionally, the first indication information and/or the second indication information may further include the number of interlaces, the information of the LBT subband, etc. For example, the first indication information may include the identifier of the first interlace, and may further include the number of interlaces, the information of the LBT subband, etc. The second indication information may include the offsets, the additive offset (or the first offset, the second offset, the third offset, the fourth offset), or the like described above.

In a possible design, the PUCCH resource parameter and/or the PUCCH format K parameter may be a radio resource control (RRC) configuration parameter (RRC signaling). It can be understood that, the PUCCH resource parameter and the PUCCH format K parameter may be carried in the same RRC configuration parameter, or may be carried in different RRC configuration parameters, and the disclosure is not limited in this regard. For example, the PUCCH resource parameter may be a PUCCH resource information element (IE). The PUCCH format K parameter may be a PUCCH format K IE. Exemplarily, when K=2, a PUCCH format 2 parameter may be a PUCCH format 2 ("PF2" for short) IE; and when K=3, a PUCCH format 3 parameter may be a PUCCH format 3 ("PF3" for short) IE.

In a possible design, if the network device determines that the PUCCH transmission corresponding to PUCCH format K uses an interlace, the indication information may be further indicative of activating the interlace corresponding to PUCCH format K configured for the terminal. If the network device determines that the PUCCH transmission corresponding to PUCCH format K does not use an interlace, the network device may not transmit the indication information to the terminal; alternatively, the network device can still transmit the indication information to the terminal, where the indication information is indicative of deactivating the interlace corresponding to PUCCH format K configured for the terminal. Optionally, the interlace corresponding to PUCCH format K configured for the terminal may be specified in a standard protocol, or may be determined by the terminal in other manners, and the disclosure is not limited in this regard.

It can be understood that, in other optional implementations, the network device can directly configure one or more interlaces for the terminal, for example, determine one or more interlaces used by the PUCCH transmission corresponding to PUCCH format K and transmit the indication information to the terminal.

In other optional implementations, K may also be a value other than 2 and/or 3, that is, the first PUCCH format may be other formats other than format 2 and/or 3, which will not be elaborated herein.

In this implementation, the network device can determine whether the PUCCH transmission corresponding to PUCCH format K uses an interlace. If the network device determines that the PUCCH transmission corresponding to PUCCH format K uses an interlace, the network device transmits the indication information to the terminal to indicate to the terminal the information of the interlace corresponding to PUCCH format K. As such, it is possible to make interlace indication by transmitting the indication information to the terminal, thereby achieving interlaced PUCCH transmission.

Figure 4:
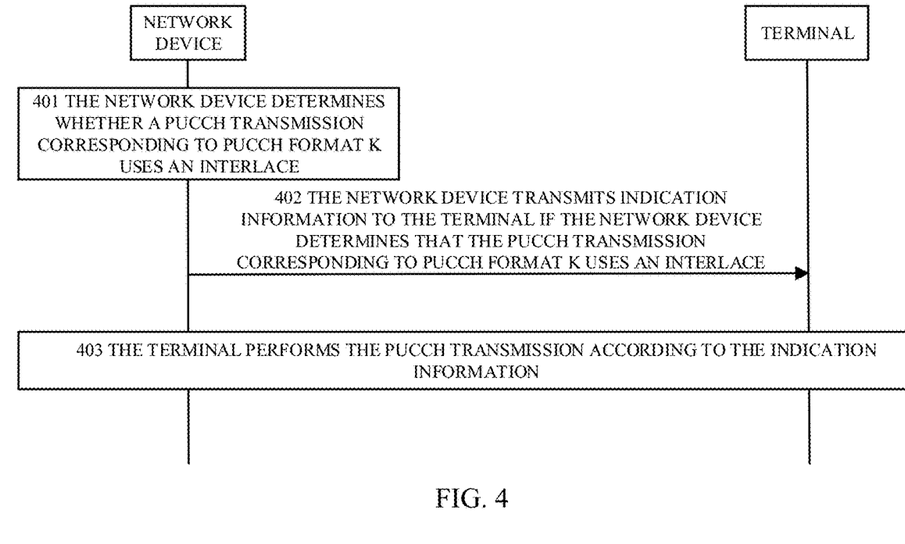
FIG. 4 is a schematic interaction diagram of an information indication method provided in implementations of the disclosure.

Refer to FIG. 4, which is a schematic interaction diagram of an information indication method provided in implementations of the disclosure. Still taking "K=2 and/or K=3" as an example, as illustrated in FIG. 4, the method includes the following.

At 401, a network device determines whether a PUCCH transmission corresponding to PUCCH format K uses an interlace.

At 402, if the network device determines that the PUCCH transmission corresponding to PUCCH format K uses an interlace, the network device transmits indication information to a terminal.

If the network device determines that the PUCCH transmission corresponding to PUCCH format K uses an interlace, the indication information may indicate to the terminal information of the interlace used by the PUCCH transmission corresponding to PUCCH format K. Optionally, the indication information may include information of an interlace corresponding to PUCCH format K, and may also be used for activating the interlace corresponding to PUCCH format K configured for the terminal.

If the network device determines that the PUCCH transmission corresponding to PUCCH format K does not use an interlace, the network device may not transmit the indication information to the terminal; alternatively, the network device can still transmit the indication information to the terminal, where the indication information may be indicative of deactivating the interlace corresponding to PUCCH format K configured for the terminal.

In other words, in a possible design, the indication information may be used for activating or deactivating the interlace corresponding to PUCCH format K configured for the terminal. Optionally, the network device may carry the indication information in a PUCCH resource parameter or a PUCCH format K parameter. The indication information may be an on/off indication such as "on/off", or may be a status indication such as "0/1", and the like. As an example, the indication information is "on/off" carried in the PUCCH resource parameter such as a PUCCH resource IE. In some scenarios, for example, when the terminal is configured with the interlace corresponding to PUCCH format K, if the indication information included in the PUCCH resource IE is "on", it can indicate to activate the interlace corresponding to PUCCH format K configured for the terminal; and if the indication information included in the PUCCH resource IE is "off", it can indicate to deactivate the interlace corresponding to PUCCH format K configured for the terminal. As another example, the indication information is "0/1" carried in the PUCCH resource parameter such as a PUCCH resource IE. If the indication information included in the PUCCH resource IE is "1", it can indicate to activate the interlace corresponding to PUCCH format K configured for the terminal; and if the indication information included in the PUCCH resource IE is "0", it can indicate to deactivate the interlace corresponding to PUCCH format K configured for the terminal. Alternatively, the network device can indicate activation or deactivation in other manners, which will not be enumerated herein.

In a possible design, if the network device determines that the PUCCH transmission corresponding to PUCCH format K uses an interlace, the indication information can include information of the interlace corresponding to PUCCH format K. The number of interlaces corresponding to PUCCH format K may be one or multiple, and the indication information includes an identifier of a first interlace. The first interlace may be any interlace among the one or more interlaces. Optionally, the indication information may further include the number of interlaces corresponding to PUCCH format K. In addition, optionally, the indication information may further include an offset of each of one or more second interlaces relative to the identifier of the first interlace. Optionally, the indication information may further include an additive offset. Furthermore, optionally, the indication information may further indicate information of an LBT subband corresponding to PUCCH format K. Optionally, any one or more of the number of interlaces, the offset, the additive offset, the LBT subband, and the like may also be specified in a standard protocol, or may be determined in other manners. Moreover, optionally, the indication information may be carried in the PUCCH resource parameter, or the indication information may be carried in the PUCCH format K parameter. Alternatively, the indication information may include first indication information and second indication information, where the first indication information may be carried in the PUCCH resource parameter and the second indication information may be carried in a PUCCH format K parameter, and the like.

Exemplarily, the number of interlace corresponding to PUCCH format K may be one. The one interlace is the first interlace. For example, the identifier of the first interlace may be carried in the PUCCH resource IE or carried in the PUCCH format K IE.

Exemplarily, the number of interlace corresponding to PUCCH format K may be multiple, and the multiple interlaces include the first interlace and one or more second interlaces.

For example, the indication information further includes an identifier(s) of the one or more second interlaces. The indication information (including the identifier of the first interlace and the identifier(s) of the second interlaces) may be carried in the PUCCH resource IE, the PUCCH format K IE, or other information. Alternatively, the identifier of the first interlace is carried in the PUCCH resource IE, and the identifier(s) of the one or more second interlaces is carried in the PUCCH format K IE.

For another example, K=2, the number of interlaces is 2, the identifier (such as index) of the first interlace is carried in the PUCCH resource IE, the number of second interlaces is 1, an offset of the second interlace relative to the index of the first interlace is carried in a PUCCH format 2 IE, and the indication information further includes an index of an LBT subband corresponding to PF2, where the index of the LBT subband is carried in the PUCCH resource IE. As shown below, suppose that there are M interlace(s) and N subband(s) in total. In a design of PUCCH format 2, two interlaces may be configured. The first interlace such as the $1^{st}$ interlace 0 is configured in a PUCCH resource IE. The LBT subband on which transmission is performed by the terminal is also indicated.

```
PUCCH-Resource ::=    SEQUENCE {
  pucch-ResourceId
  interlace 0 index     INTEGER (0..M - 1)
  LBT SB index          INTEGER (0..N - 1)
  OPTIONAL, -- Need
    format                CHOICE {
      format0               PUCCH-format0,
      format1               PUCCH-format1,
      format2               PUCCH-format2,
      format3               PUCCH-format3,
    }
}
```

M is correlated with SCS. For example, if SCS=30 khz, M=5; and if SCS=15 khz, M=10, which will not be described in detail herein.

In addition, an offset corresponding to the second interlace (such as a $2^{nd}$ interlace) may be configured in the PUCCH format 2 IE, that is, an offset relative to interlace 0 is added.

```
PUCCH-format2 ::=    SEQUENCE {
    offset               INTEGER (1..M − 1),
    nrofSymbols          INTEGER (1..2),
    startingSymbolIndex  INTEGER(0..13)
}
```

A value of the offset may be 1~M-1, and mod M can be performed, that is, the second interlace (such as interlace 1)=(interlace 0+offset) mod M. It can be understood that, if the offset is not configured, it indicates that there is only one interlace, such as interlace 0 described above.

For another example, K=3, the number of interlaces is more than two, an index of the first interlace is carried in the PUCCH resource IE, offsets of one or more second interlaces relative to the index of the first interlace are carried in a PUCCH format 3 IE, and the indication information further includes an index of an LBT subband corresponding to PF3 and the number of interlaces, where the index of the LBT subband and the number of interlaces are carried in the PUCCH resource IE. As shown below, suppose that there are M interlace(s) and N LBT subband(s) in total. In a design of PUCCH format 3, the first interlace such as the $1^{st}$ interlace 0 is configured in the PUCCH resource IE. The LBT subband on which transmission is performed by the terminal is also indicated. The number of interlaces (Interlace number, which may be one or multiple and can be M at most) is configured.

```
PUCCH-Resource ::=      SEQUENCE {
pucch-ResourceId
interlace 0 index       INTEGER (0..M − 1)
LBT SB index            INTEGER (0..N − 1)
Interlace number        INTEGER (1..M)
OPTIONAL, -- Need
format                  CHOICE {
    format0                 PUCCH-format0,
    format1                 PUCCH-format1,
    format2                 PUCCH-format2,
    format3                 PUCCH-format3,
    }
}
```

In addition, offsets of the one or more second interlaces relative to the first interlace, such as an offset corresponding to a $2^{nd}$ interlace (i.e. Offset 1) and an offset corresponding to a $3^{rd}$ interlace (i.e. Offset 2), may be configured in the PUCCH format 3 IE. If the network device such as a base station configures a number indication of 3 interlaces in the PUCCH resource IE, the base station can indicate offsets of the other two interlaces other than interlace 0 in the PUCCH-format 3 IE.

```
PUCCH-format3 ::=    SEQUENCE {
    Offset1              INTEGER (1..M − 1),
    Offset2              INTEGER (1..M − 1),
    nrofSymbols          INTEGER (1..2),
    startingSymbolIndex  INTEGER(0..13)
}
```

A value of each of Offset 1 and Offset 2 may be 1~M-1, and mod M is performed. For example, interlace 1=(interlace 0+offset 1) mod M, and interlace 2=(interlace 0+offset 2) mod M.

For another example, K=2, the number of interlaces is more than two, an index of the first interlace is carried in the PUCCH resource IE, an additive offset is carried in a PUCCH format 2 IE, and the indication information further includes an index of an LBT subband corresponding to PF2 and the number of interlaces, where the index of the LBT subband and the number of interlaces are carried in the PUCCH resource IE. As shown below, suppose that there are M interlaces and N subbands in total. In a design of PUCCH format 2, more than two interlace can be configured. The first interlace such as the $1^{st}$ interlace 0 is configured in the PUCCH resource IE. The LBT subband on which transmission is performed by the terminal is indicated. The number of interlaces (Interlace number, which may be one or multiple and can be M at most) is configured.

```
PUCCH-Resource ::=      SEQUENCE {
pucch-ResourceId
interlace 0 index       INTEGER (0..M − 1)
LBT SB index            INTEGER (0..N− 1)
Interlace number        INTEGER (1..M)
OPTIONAL, -- Need
format                  CHOICE {
    format0                 PUCCH-format0,
    format1                 PUCCH-format1,
    format2                 PUCCH-format2,
    format3                 PUCCH-format3,
    }
}
```

In addition, an additive offset of multiple interlaces is configured for format 2. Suppose that the network device such as a base station configures three interlaces in the PUCCH resource IE, the base station can indicate an additive offset of the other two interlaces other than interlace 0 in the PUCCH format 2 IE.

```
PUCCH-format2 ::=    SEQUENCE {
    Offset               INTEGER (1..M − 1),
    nrofSymbols          INTEGER (1..2),
    startingSymbolIndex  INTEGER(0..13)
}
```

Indexes of the other two interlaces may be obtained through addition with the additive offset described above. For example, interlace 1=(interlace 0+1*offset) mod M, and interlace 2=(interlace 0+2*offset) mod M.

For another example, there is no offset indication, that is, the indication information does not include the offset described above. Specifically, the offset may be fixed, and may be specified in a standard protocol or determined in other manners.

Exemplarily, the number of interlaces corresponding to PUCCH format K may be one or multiple, and the one or multiple interlaces include one or more second interlaces. In other words, in these examples, the interlace corresponding to PUCCH format K does not include the first interlace. The first interlace is only used for determining the one or more second interlaces, for example, determining the one or more second interlaces in connection with the offset. In other words, the identifier of the first interlace is used as a reference for determining the second interlace, instead of taking the first interlace as the interlace corresponding to PUCCH format K.

At 403, the terminal performs the PUCCH transmission according to the indication information.

The terminal can receive the indication information from the network device, thereby performing the PUCCH transmission according to the indication information. Optionally, "the terminal performs the PUCCH transmission according to the indication information" may mean that the terminal performs the PUCCH transmission according to the interlace corresponding to PUCCH format K indicated by the indication information; alternatively, the terminal can determine an interlace for the PUCCH transmission (that is, a target interlace) according to the interlace corresponding to PUCCH format K determined based on the indication information, and perform the PUCCH transmission based on the target interlace.

In a possible design, once receiving the indication information, the terminal can determine the interlace corresponding to PUCCH format K, thereby performing the PUCCH transmission directly based on the interlace corresponding to PUCCH format K. For example, if the terminal determines, according to a structure of the indication information, that the interlace corresponding to PUCCH format K is the first interlace and one or more second interlaces, the terminal can perform the PUCCH transmission based on the first interlace and the one or more interlaces; if the terminal determines, according to a structure of the indication information, that the interlace corresponding to PUCCH format K is one or more second interlaces, the terminal can perform the PUCCH transmission based on the one or more interlaces; and if the terminal determines, according to a structure of the indication information, that the interlace corresponding to PUCCH format K is the first interlace, the terminal can perform the PUCCH transmission based on the first interlace, etc., which will not be elaborated herein. Optionally, if the indication information includes the information of the LBT subband, the terminal can also perform the PUCCH transmission on the LBT subband based on the determined interlace corresponding to PUCCH format K.

In a possible design, once receiving the indication information, the terminal can determine the interlace corresponding to PUCCH format K. If the corresponding interlace is multiple, the terminal device can further determine a target interlace from the interlace corresponding to PUCCH format K (hereinafter, "multiple interlaces" for short), and perform the PUCCH transmission based on the target interlace. For example, when a load of the terminal is small (for example, the load is smaller than a threshold), the terminal determines the target interlace from the interlace corresponding to PUCCH format K to perform the PUCCH transmission.

Optionally, the target interlace may be determined according to orthogonal cover code (OCC) configuration information. For example, the terminal can determine an interlace corresponding to the OCC configuration information among multiple interlaces as the target interlace, that is, the target interlace may be the interlace corresponding to the OCC configuration information among the multiple interlaces. For another example, the terminal can determine an interlace that does not correspond to the OCC configuration information among multiple interlaces as the target interlace. For another example, the terminal can determine an interlace, which corresponds to OCC configuration information corresponding to an OCC length greater than 1, as the target interlace. The terminal can determine an interlace, which corresponds to OCC configuration information corresponding to an OCC length of 1, as the target interlace. In addition, optionally, the OCC configuration information may be carried in the PUCCH resource parameter, may be carried in the PUCCH format 2 parameter and/or the PUCCH format 3 parameter.

Alternatively, optionally, the target interlace may be determined according to a preset rule. The terminal may fixedly determine the first interlace included in the PUCCH resource parameter as the target interlace, or fixedly determine the second interlace included in the PUCCH format 2 parameter and/or the PUCCH format 3 parameter as the target interlace.

In other optional implementations, K may also be a value other than 2 and/or 3, that is, the first PUCCH format may be other formats other than 2 and/or 3, which will not be elaborated herein.

In this implementation, the network device can determine whether the PUCCH transmission corresponding to PUCCH format K uses an interlace. If the network device determines that the PUCCH transmission corresponding to PUCCH format K uses an interlace, the network device transmits the indication information to the terminal to indicate to the terminal the information of the interlace corresponding to PUCCH format K, such that the terminal can perform the PUCCH transmission based on the interlace indicated. As such, it is possible to make interlace indication by transmitting the indication information to the terminal and thus achieve interlaced PUCCH transmission, which is conducive to improving flexibility and reliability in interlaced PUCCH transmission.

It can be understood that, the foregoing method implementations are examples of the information indication method of the disclosure. The description of each implementation has its own emphasis. For the parts not described in detail in one implementation, reference may be made to related descriptions in other implementations.

Figure 5:
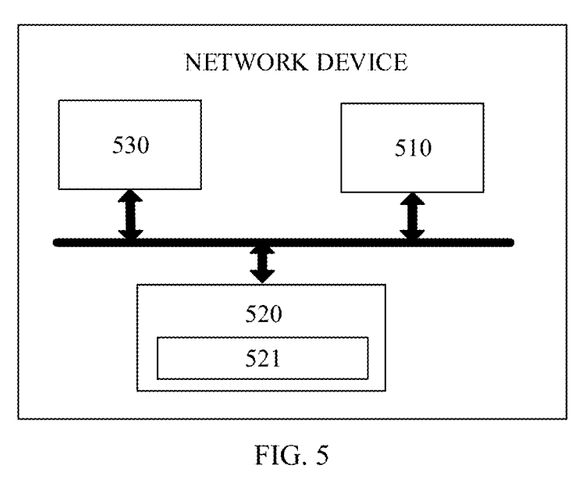
FIG. 5 is a schematic structural diagram of a network device provided in implementations of the disclosure.

Refer to FIG. 5, which is a schematic structural diagram of a network device provided in implementations of the disclosure. As illustrated in FIG. 5, the network device 500 includes a processor 510, a memory 520, a communication interface 530 such as a transceiver, and one or more programs 521. The one or more programs 521 are stored in the memory 520 and configured to be executed by the processor 510. The programs include instructions for performing the following operations.

Whether a PUCCH transmission corresponding to a first PUCCH format uses an interlace is determined. K=2 and/or K=3. Based on a determination that the PUCCH transmission corresponding to the first PUCCH format uses an interlace, the communication interface 530 is invoked to transmit indication information to a terminal, where the indication information indicates to the terminal information of the interlace used by the PUCCH transmission corresponding to the first PUCCH format.

In a possible design, the instructions in the programs are further configured to determine the number of interlaces used by the PUCCH transmission corresponding to the first PUCCH format. In terms of transmitting the indication information to the terminal, the instructions in the programs are specifically configured to invoke the communication interface 530 and transmit the indication information to the terminal according to the number of interlaces used by the PUCCH transmission corresponding to the first PUCCH format.

In a possible design, the indication information includes an identifier of the interlace used by the PUCCH transmission corresponding to the first PUCCH format.

In a possible design, the number of interlaces used by the PUCCH transmission corresponding to the first PUCCH format is multiple, and the indication information includes an identifier of a first interlace and a first offset of each of one or more second interlaces relative to the identifier of the first interlace, where the multiple interlaces include the first interlace and the one or more second interlaces.

In another possible design, the number of interlaces used by the PUCCH transmission corresponding to the first PUCCH format is multiple, the indication information includes an identifier of a first interlace and a second offset, and the second offset indicates identifiers of multiple second interlaces, where the multiple interlaces include the first interlace and the multiple second interlaces.

In another possible design, the number of interlaces used by the PUCCH transmission corresponding to the first PUCCH format is multiple, the indication information includes multiple third offsets, and the multiple third offsets indicate identifiers of the multiple interlaces.

In another possible design, the number of interlaces used by the PUCCH transmission corresponding to the first PUCCH format is multiple, the indication information includes a fourth offset, and the fourth offset indicates identifiers of the multiple interlaces.

In a possible design, the indication information further includes the number of interlaces used by the PUCCH transmission corresponding to the first PUCCH format.

In a possible design, the indication information indicates information of an LBT subband corresponding to the PUCCH transmission corresponding to the first PUCCH format.

In a possible design, the information of the LBT subband is carried in a PUCCH resource parameter or carried in a first PUCCH format parameter, and the PUCCH resource parameter and/or the first PUCCH format parameter is an RRC configuration parameter.

In a possible design, the indication information is carried in a PUCCH resource parameter, and the PUCCH resource parameter is an RRC configuration parameter.

In another possible design, the indication information is carried in a first PUCCH format parameter, and the first PUCCH format parameter is an RRC configuration parameter.

In a possible design, the number of interlaces used by the PUCCH transmission corresponding to the first PUCCH format is multiple, the indication information includes first indication information and second indication information, the first indication information is carried in a PUCCH resource parameter, the second indication information is carried in a first PUCCH format parameter, and the PUCCH resource parameter and/or the first PUCCH format parameter is an RRC configuration parameter. The first indication information includes an identifier of a first interlace, the second indication information indicates an identifier of one or more second interlaces, and the multiple interlaces include the first interlace and the one or more second interlaces.

Figure 6:
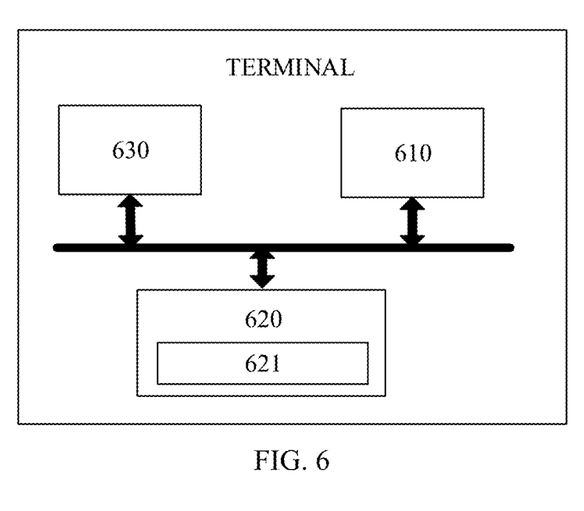
FIG. 6 is a schematic structural diagram of a terminal provided in implementations of the disclosure.

Refer to FIG. 6, which is a schematic structural diagram of a terminal provided in implementations of the disclosure. As illustrated in FIG. 6, the terminal 600 includes a processor 610, a memory 620, a communication interface 630 such as a transceiver, and one or more programs 621. The one or more programs 621 are stored in the memory 620 and configured to be executed by the processor 610. The programs include instructions for performing the following operations.

The communication interface 630 is invoked to receive indication information from a network device, where the indication information indicates information of an interlace used by a PUCCH transmission corresponding to a first PUCCH format. K=2 and/or K=3. The communication interface 630 is invoked to perform the PUCCH transmission according to the indication information.

In a possible design, the indication information includes an identifier of the interlace used by the PUCCH transmission corresponding to the first PUCCH format.

In a possible design, the number of interlaces used by the PUCCH transmission corresponding to the first PUCCH format is multiple, and the indication information includes an identifier of a first interlace and a first offset of each of one or more second interlaces relative to the identifier of the first interlace, where the multiple interlaces include the first interlace and the one or more second interlaces.

In another possible design, the number of interlaces used by the PUCCH transmission corresponding to the first PUCCH format is multiple, the indication information includes an identifier of a first interlace and a second offset, and the second offset indicates identifiers of multiple second interlaces, where the multiple interlaces include the first interlace and the multiple second interlaces.

In another possible design, the number of interlaces used by the PUCCH transmission corresponding to the first PUCCH format is multiple, the indication information includes multiple third offsets, and the multiple third offsets indicate identifiers of the multiple interlaces.

In another possible design, the number of interlaces used by the PUCCH transmission corresponding to the first PUCCH format is multiple, the indication information includes a fourth offset, and the fourth offset indicates identifiers of the multiple interlaces.

In a possible design, the indication information further includes the number of interlaces used by the PUCCH transmission corresponding to the first PUCCH format.

In a possible design, the indication information indicates information of an LBT subband corresponding to the PUCCH transmission corresponding to the first PUCCH format.

In a possible design, the information of the LBT subband is carried in a PUCCH resource parameter or carried in a first PUCCH format parameter, and the PUCCH resource parameter and/or the first PUCCH format parameter is an RRC configuration parameter.

In a possible design, the indication information is carried in a PUCCH resource parameter, and the PUCCH resource parameter is an RRC configuration parameter.

In another possible design, the indication information is carried in a first PUCCH format parameter, and the first PUCCH format parameter is an RRC configuration parameter.

In a possible design, the number of interlaces used by the PUCCH transmission corresponding to the first PUCCH format is multiple, the indication information includes first indication information and second indication information, the first indication information is carried in a PUCCH resource parameter, the second indication information is carried in a first PUCCH format parameter, and the PUCCH resource parameter and/or the first PUCCH format parameter is an RRC configuration parameter. The first indication information includes an identifier of a first interlace, the second indication information indicates an identifier of one or more second interlaces, and the multiple interlaces include the first interlace and the one or more second interlaces.

Technical solutions of implementations of the disclosure have been elaborated above from the perspective of interaction between various network elements. It can be understood that, in order to implement the above functions, the terminal and the network device include hardware structures and/or software modules for performing respective functions. Those of ordinary skill in the art will appreciate that units and algorithmic operations of various examples described in connection with implementations of the disclosure can be implemented by hardware or by a combination of hardware and computer software. Whether these functions are performed by means of hardware or hardware driven by computer software depends on the particular application and the design constraints of the associated technical solution. Those skilled in the art may use different methods with regard to each particular application to implement the described functionality, but such methods should not be regarded as lying beyond the scope of the disclosure.

Division of functional units of the network device and the terminal may be implemented according to the above method implementations in implementations of the disclosure. For example, various functional units may be divided to be in one-to-one correspondence with each function, or two or more functions may be integrated into one processing unit. The integrated unit may be implemented in the form of hardware, or may be implemented in the form of software program module. It is to be noted that, division of units in implementations of the disclosure is illustrative and is only a division of logical functions, and there may exist other manners of division in practice.

Figure 7:
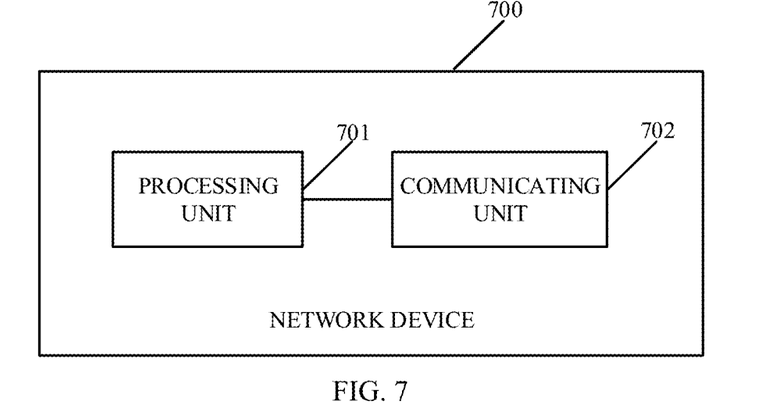
FIG. 7 is a schematic structural diagram of another network device provided in implementations of the disclosure.

Refer to FIG. 7, which illustrates another possible schematic structural diagram of the network device in the foregoing implementations. As illustrated in FIG. 7, the network device 700 may include a processing unit 701 and a communicating unit 702. These units can perform corresponding functions of the network device in the foregoing method implementations. The processing unit 701 is configured to control and manage operations of the network device. For example, the processing unit 701 is configured to support the network device to perform steps 301 to 302 illustrated in FIG. 3, 401 illustrated in FIG. 4, and/or other processes described in the technical solutions of the disclosure. The communicating unit 702 is configured to support the network device to communicate with other devices, for example, communicate with a terminal. The network device may further include a storage unit 703. The storage unit 703 is configured to store program codes and data of the network device.

The processing unit 701 may be a processor or a controller and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in implementations of the disclosure can be implemented or executed. The processor may also be a combination for implementing computing functions, for example, one or more microprocessors, a combination of DSP and microprocessor, or the like. The communicating unit 702 may be a transceiver, a transceiver circuit, a radio frequency (RF) chip, a communication interface, etc. The storage unit 703 may be a memory.

For example, the processing unit 701 is configured to determine whether a PUCCH transmission corresponding to a first PUCCH format uses an interlace. K=2 and/or K=3. The communicating unit 702 is configured to transmit indication information to a terminal when the processing unit determines that the PUCCH transmission corresponding to the first PUCCH format uses an interlace, where the indication information indicates to the terminal information of the interlace used by the PUCCH transmission corresponding to the first PUCCH format.

In a possible design, the processing unit 701 is further configured to determine the number of interlaces used by the PUCCH transmission corresponding to the first PUCCH format. The communicating unit 702 is specifically configured to transmit the indication information to the terminal according to the number of interlaces used by the PUCCH transmission corresponding to the first PUCCH format.

In a possible design, the indication information includes an identifier of the interlace used by the PUCCH transmission corresponding to the first PUCCH format.

In a possible design, the number of interlaces used by the PUCCH transmission corresponding to the first PUCCH format is multiple, and the indication information includes an identifier of a first interlace and a first offset of each of one or more second interlaces relative to the identifier of the first interlace, where the multiple interlaces include the first interlace and the one or more second interlaces.

In another possible design, the number of interlaces used by the PUCCH transmission corresponding to the first PUCCH format is multiple, the indication information includes an identifier of a first interlace and a second offset, and the second offset indicates identifiers of multiple second interlaces, where the multiple interlaces include the first interlace and the multiple second interlaces.

In another possible design, the number of interlaces used by the PUCCH transmission corresponding to the first PUCCH format is multiple, the indication information includes multiple third offsets, and the multiple third offsets indicate identifiers of the multiple interlaces.

In another possible design, the number of interlaces used by the PUCCH transmission corresponding to the first PUCCH format is multiple, the indication information includes a fourth offset, and the fourth offset indicates identifiers of the multiple interlaces.

In a possible design, the indication information further includes the number of interlaces used by the PUCCH transmission corresponding to the first PUCCH format.

In a possible design, the indication information indicates information of an LBT subband corresponding to the PUCCH transmission corresponding to the first PUCCH format.

In a possible design, the information of the LBT subband is carried in a PUCCH resource parameter or carried in a first PUCCH format parameter, and the PUCCH resource parameter and/or the first PUCCH format parameter is an RRC configuration parameter.

In a possible design, the indication information is carried in a PUCCH resource parameter, and the PUCCH resource parameter is an RRC configuration parameter.

In another possible design, the indication information is carried in a first PUCCH format parameter, and the first PUCCH format parameter is an RRC configuration parameter.

In a possible design, the number of interlaces used by the PUCCH transmission corresponding to the first PUCCH format is multiple, the indication information includes first indication information and second indication information, the first indication information is carried in a PUCCH resource parameter, the second indication information is carried in a first PUCCH format parameter, and the PUCCH resource parameter and/or the first PUCCH format parameter is an RRC configuration parameter. The first indication information includes an identifier of a first interlace, the second indication information indicates an identifier of one or more second interlaces, and the multiple interlaces include the first interlace and the one or more second interlaces.

When the processing unit 701 is a processor, the communicating unit 702 is a communication interface, and the storage unit 703 is a memory, the terminal in this implementation of the disclosure may be the terminal illustrated in FIG. 5.

Optionally, with the above units, the terminal can implement some or all operations performed by the terminal in the methods of implementations illustrated in FIG. 3 and FIG. 4. It should be understood that, this implementation of the disclosure is apparatus implementations corresponding to the method implementations. Descriptions of the method implementations can also be applied to this implementation of the disclosure, which will not be elaborated again herein.

Figure 8:
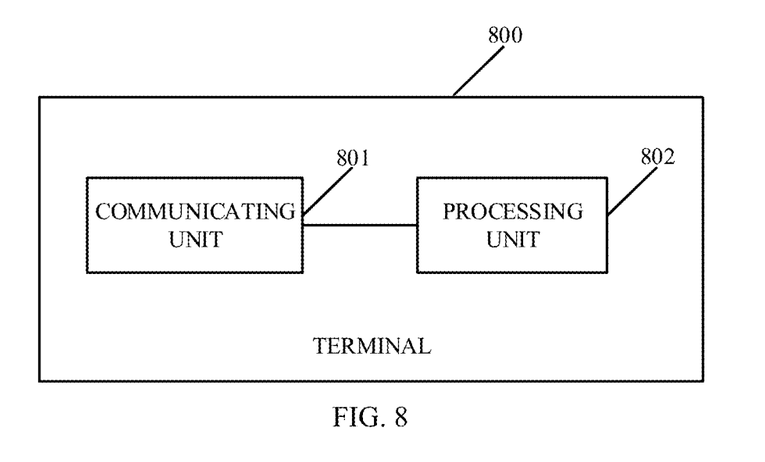
FIG. 8 is a schematic structural diagram of another terminal provided in implementations of the disclosure.

Refer to FIG. 8, which illustrates another possible schematic structural diagram of the terminal in the foregoing implementations. The terminal 800 may include a communicating unit 801 and a processing unit 802. These units can perform corresponding functions of the terminal in the foregoing method implementations. The processing unit 802 is configured to control and manage operations of the terminal. For example, the processing unit 802 is configured to support the terminal to perform step 403 illustrated in FIG. 4 and/or other processes described in the technical solutions of the disclosure. The communicating unit 801 is configured to support the terminal to communicate with other devices, for example, communicate with a network device. The terminal may further include a storage unit 803. The storage unit 803 is configured to store program codes and data of the terminal.

The processing unit 802 may be a processor or a controller. The communicating unit 801 may be a transceiver, a transceiver circuit, an RF chip, a communication interface, etc. The storage unit 803 may be a memory.

For example, the communicating unit 801 is configured to receive indication information from a network device, where the indication information indicates information of an interlace used by a PUCCH transmission corresponding to a first PUCCH format. K=2 and/or K=3. The processing unit 802 is configured to perform the PUCCH transmission according to the indication information through the communicating unit 801.

In a possible design, the indication information includes an identifier of the interlace used by the PUCCH transmission corresponding to the first PUCCH format.

In a possible design, the number of interlaces used by the PUCCH transmission corresponding to the first PUCCH format is multiple, and the indication information includes an identifier of a first interlace and a first offset of each of one or more second interlaces relative to the identifier of the first interlace, where the multiple interlaces include the first interlace and the one or more second interlaces.

In another possible design, the number of interlaces used by the PUCCH transmission corresponding to the first PUCCH format is multiple, the indication information includes an identifier of a first interlace and a second offset, and the second offset indicates identifiers of multiple second interlaces, where the multiple interlaces include the first interlace and the multiple second interlaces.

In another possible design, the number of interlaces used by the PUCCH transmission corresponding to the first PUCCH format is multiple, the indication information includes multiple third offsets, and the multiple third offsets indicate identifiers of the multiple interlaces.

In another possible design, the number of interlaces used by the PUCCH transmission corresponding to the first PUCCH format is multiple, the indication information includes a fourth offset, and the fourth offset indicates identifiers of the multiple interlaces.

In a possible design, the indication information further includes the number of interlaces used by the PUCCH transmission corresponding to the first PUCCH format.

In a possible design, the indication information indicates information of an LBT subband corresponding to the PUCCH transmission corresponding to the first PUCCH format.

In a possible design, the information of the LBT subband is carried in a PUCCH resource parameter or carried in a first PUCCH format parameter, and the PUCCH resource parameter and/or the first PUCCH format parameter is an RRC configuration parameter.

In a possible design, the indication information is carried in a PUCCH resource parameter, and the PUCCH resource parameter is an RRC configuration parameter.

In another possible design, the indication information is carried in a first PUCCH format parameter, and the first PUCCH format parameter is an RRC configuration parameter.

In a possible design, the number of interlaces used by the PUCCH transmission corresponding to the first PUCCH format is multiple, the indication information includes first indication information and second indication information, the first indication information is carried in a PUCCH resource parameter, the second indication information is carried in a first PUCCH format parameter, and the PUCCH resource parameter and/or the first PUCCH format parameter is an RRC configuration parameter. The first indication information includes an identifier of a first interlace, the second indication information indicates an identifier of one or more second interlaces, and the multiple interlaces include the first interlace and the one or more second interlaces.

When the processing unit 802 is a processor, the communicating unit 801 is a communication interface, and the storage unit 803 is a memory, the terminal in this implementation of the disclosure may be the network device illustrated in FIG. 6.

Optionally, with the above units, the network device can implement some or all operations performed by the network device in the methods of implementations illustrated in FIG. 3 and FIG. 4. It should be understood that, this implementation of the disclosure is apparatus implementations corresponding to the method implementations. Descriptions of the method implementations can also be applied to this implementation of the disclosure, which will not be elaborated again herein.

It can be understood that, the division of units in implementations of the disclosure is only a division of logical functions, and there may exist other manners of division in practice. Various functional units described in implementations of the disclosure may be integrated into one processing unit or may be present as a number of physically separated units, and two or more units may be integrated into one. The integrated unit above may take the form of hardware or a software functional unit.

The disclosure further provides a communication system. The system includes the terminal and/or the network device described above. Optionally, the system may further include other devices that interact with the above network elements in the technical solutions of implementations of the disclosure. The network device and/or the terminal can perform some or all operations of the methods in implementations illustrated in FIG. 3 to FIG. 4. For details thereof, reference can be made to related descriptions in the foregoing implementations, which will not be repeated herein.

Implementations of the disclosure further provide a computer readable storage medium. The computer readable storage medium is configured to store computer programs used for electronic data interchange (EDI). The computer programs are operable with a computer to perform some or all operations performed by the terminal in the foregoing method implementations.

Implementations of the disclosure further provide a computer readable storage medium. The computer readable storage medium is configured to store computer programs used for EDI. The computer programs are operable with a computer to perform some or all operations performed by the network device in the foregoing method implementations.

Implementations of the disclosure further provide a computer program product. The computer program product includes a non-transitory computer readable storage medium storing computer programs. The computer programs are operable with a computer to perform some or all operations performed by the terminal in the foregoing method implementations. The computer program product may be a software installation package.

Implementations of the disclosure further provide a computer program product. The computer program product includes a non-transitory computer readable storage medium storing computer programs. The computer programs are operable with a computer to perform some or all operations performed by the network device in the foregoing method implementations. The computer program product may be a software installation package.

The steps of the method or algorithm described in implementations of the disclosure may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in a communication device such as the terminal or the network device. The processor and the storage medium may also be present as discrete components in the communication device.

It can be understood that, the "first", "second", "third", and various numerical numbers involved in the disclosure are only intended for distinction for the convenience of description, rather than limiting the scope of the implementations of the disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

In various implementations of the disclosure, the magnitude of a sequence number of each process does not mean an order of execution, and the order of execution of each process should be determined by its function and an internal logic and shall not constitute any limitation to an implementation process of implementations of the disclosure.

Those skilled in the art will appreciate that, all or part of functions described in one or more of the foregoing implementations can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

What is claimed is:

1. An information indication method, comprising:
   determining, by a network device, whether a physical uplink control channel (PUCCH) transmission corresponding to a first PUCCH format uses an interlace; and
   transmitting, by the network device, indication information to a terminal when the network device determines that the PUCCH transmission corresponding to the first PUCCH format uses an interlace, the indication information indicating to the terminal information of the interlace used by the PUCCH transmission corresponding to the first PUCCH format;
   wherein multiple interlaces are used by the PUCCH transmission corresponding to the first PUCCH format, the multiple interlaces comprise a first interlace and one or more second interlaces, the indication information comprises first indication information and second indication information, the first indication information comprises an identifier of the first interlace, the second indication information indicates an identifier of the one or more second interlaces,
   wherein the first indication information is carried in a PUCCH resource parameter, the second indication information is carried in a first PUCCH format parameter, and the PUCCH resource parameter and/or the first PUCCH format parameter is a radio resource control, RRC, configuration parameter.

2. The method of claim 1, wherein the one or more second interlaces is one interlace, and the multiple interlaces are two interlaces.

3. The method of claim 2, wherein the first interlace and the second interlace are two interlaces among M available interlaces, and the second interlace has a first offset relative to the first interlace.

4. The method of claim 3, wherein an identifier of the first interlace, an identifier of the second interlace, the first offset, and M satisfy:

the identifier of the second interlace=(the identifier of the first interlace+the first offset) mod M.

5. The method of claim 3, wherein the first offset has a value specified in a standard protocol.

6. The method of claim 1, wherein the indication information further indicates information of a listen before talk (LBT) subband corresponding to the PUCCH transmission corresponding to the first PUCCH format;
wherein the information of the LBT subband is carried in the PUCCH resource parameter.

7. The method of claim 1, wherein the PUCCH resource parameter and the first PUCCH format parameter are carried in a same RRC signaling.

8. An information indication method, comprising:
receiving, by a terminal, indication information from a network device, the indication information indicating information of an interlace used by a physical uplink control channel (PUCCH) transmission corresponding to a first PUCCH format; and
performing, by the terminal, the PUCCH transmission according to the indication information,
wherein the interlace used by the PUCCH transmission corresponding to the first PUCCH format is two interlaces, the indication information comprises first indication information and second indication information, the first indication information is carried in a PUCCH resource parameter, the second indication information is carried in a first PUCCH format parameter, and the PUCCH resource parameter and/or the first PUCCH format parameter is a radio resource control, RRC, configuration parameter,
wherein the first indication information comprises an identifier of a first interlace and the second indication information indicates an identifier of a second interlace.

9. The method of claim 8, wherein the PUCCH resource parameter and the first PUCCH format parameter are carried in a same RRC signaling.

10. The method of claim 8, wherein the first interlace and the second interlace are two interlaces among M available interlaces, and the second interlace has a first offset relative to the first interlace.

11. The method of claim 10, wherein the identifier of the first interlace, the identifier of the second interlace, the first offset, and M satisfies:

the identifier of the second interlace=(the identifier of the first interlace+the first offset) mod M.

12. The method of claim 10, wherein the first offset has a value specified in a standard protocol.

13. A network device, comprising:
a transceiver;
a processor; and
a memory storing computer programs which, when executed by the processor, are operable with the processor to determine whether a physical uplink control channel (PUCCH) transmission corresponding to a first PUCCH format uses an interlace; and
wherein the computer programs, when executed by the processor, cause the transceiver to transmit indication information to a terminal when the processor determines that the PUCCH transmission corresponding to the first PUCCH format uses an interlace, the indication information indicating to the terminal information of the interlace used by the PUCCH transmission corresponding to the first PUCCH format;
wherein multiple interlaces are used by the PUCCH transmission corresponding to the first PUCCH format, the multiple interlaces comprise a first interlace and one or more second interlaces, the indication information comprises first indication information and second indication information, the first indication information comprises an identifier of the first interlace, the second indication information indicates an identifier of the one or more second interlaces,
wherein the first indication information is carried in a PUCCH resource parameter, the second indication information is carried in a first PUCCH format parameter, and the PUCCH resource parameter and/or the first PUCCH format parameter is a radio resource control, RRC, configuration parameter.

14. The network device of claim 13, wherein the computer programs, when executed by the processor, are further operable with the processor to determine the quantity of interlaces used by the PUCCH transmission corresponding to the first PUCCH format, and cause the transceiver to transmit the indication information to the terminal according to the quantity of interlaces used by the PUCCH transmission corresponding to the first PUCCH format.

15. The network device of claim 13, wherein the indication information comprises an identifier of the interlace used by the PUCCH transmission corresponding to the first PUCCH format.

16. A terminal, comprising:
a transceiver;
a processor; and
a memory storing computer programs which, when executed by the processor, cause the transceiver to receive indication information from a network device, the indication information indicating information of an interlace used by a physical uplink control channel (PUCCH) transmission corresponding to a first PUCCH format; and
wherein the computer programs, when executed by the processor, are operable with the processor to invoke the transceiver to perform the PUCCH transmission according to the indication information,
wherein the interlace used by the PUCCH transmission corresponding to the first PUCCH format is two interlaces, the indication information comprises first indication information and second indication information, the first indication information is carried in a PUCCH resource parameter, the second indication information is carried in a first PUCCH format parameter, and the PUCCH resource parameter and/or the first PUCCH format parameter is a radio resource control, RRC, configuration parameter, wherein
wherein the first indication information comprises an identifier of a first interlace and the second indication information indicates an identifier of a second interlace.

17. The terminal of claim 16, wherein the indication information comprises an identifier of the interlace used by the PUCCH transmission corresponding to the first PUCCH format.

18. The terminal of claim 16, wherein the indication information indicates information of a listen before talk (LBT) subband corresponding to the PUCCH transmission corresponding to the first PUCCH format.

19. The terminal of claim 18, wherein the information of the LBT subband is carried in a PUCCH resource parameter of the indication information.

\* \* \* \* \*